June 4, 1946.  J. S. ARNOLD  2,401,600
POLYPHASE VIBRATORY DEVICE
Filed May 16, 1942
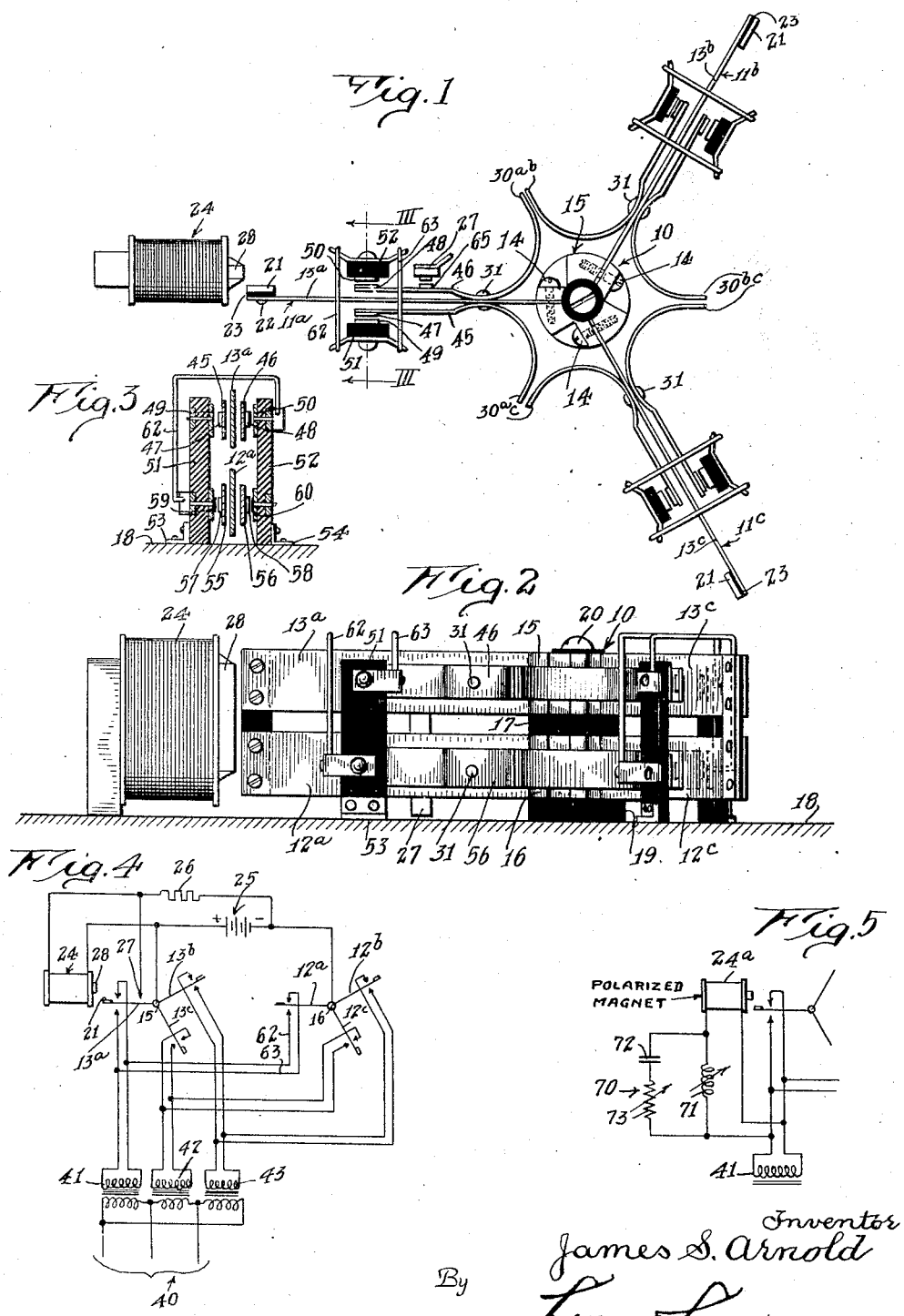
Inventor
James S. Arnold
By Lyon & Lyon
Attorneys Patented June 4, 1946

2,401,600

UNITED STATES PATENT OFFICE 2,401,600

POLYPHASE VIBRATORY DEVICE

James S. Arnold, Los Angeles, Calif.

Application May 16, 1942, Serial No. 443,208

4 Claims. (Cl. 175—365)

This invention relates to polyphase vibratory devices and has particular application to current inverters and rectifiers.

An object of the invention is to provide a simple and inexpensive multiple reed vibrator in which the different reeds vibrate in predetermined phase with respect to each other.

Another object is to provide a simple vibratory switching structure for changing direct current to polyphase alternating current, or vice versa.

A more specific object is to provide a multi-contact vibratory switch in which different groups of contacts are automatically closed and opened in timed sequence corresponding to the time lag between the currents in different phases of a polyphase A. C. system.

Vibratory inverters for converting direct current into single phase alternating current are quite old, having been employed extensively in telephony for many years to produce relatively low frequency ringing current from banks of dry cells. They have also been employed extensively in recent years in automobile radio sets, to convert direct current from the automobile storage battery into alternating current which could be transformed to a higher voltage and used as a source of plate current for the radio tubes.

However, to the best of my knowledge, no one has heretofore discovered a simple and practicable structure for vibrating a plurality of sets of reeds in timed relation corresponding to the timing of the different phases in a polyphase A. C. system, despite the fact that it is sometimes highly desirable to produce polyphase A. C. power from direct current, as for laboratory purposes, driving small polyphase motors, etc.

In accordance with the present invention, I provide a polyphase vibratory reed structure in which one of the reeds is driven by a magnet, and it in turn drives the other reeds at the same frequency, but in symmetrically displaced phase relation thereto. By providing contacts actuated by the different reeds and connected to the different phases of a polyphase A. C. line, and to a D. C. line, the device can be made to function either to convert direct current from the D. C. line into polyphase A. C. current delivered to the A. C. line, or to receive polyphase current from the A. C. line, rectify it, and deliver it to the D. C. line. The entire device may, if desired, be mounted in an evacuated container, to reduce sparking and increase the power handling capacity.

The invention will be explained by describing in detail a specific embodiment thereof, as illustrated in the drawing, it being understood that various departures from the exact construction shown may be made while still utilizing the essential features of my invention.

In the drawing:

Fig. 1 is a plan view of a 3-phase vibrating device in accordance with the invention;

Fig. 2 is a front elevation view of the device;

Fig. 3 is a detail vertical section taken in the plane III—III of Fig. 1;

Fig. 4 is a schematic diagram of a circuit that may be employed with the vibrator to produce 3-phase alternating current from direct current; and Fig. 5 shows a modified driving circuit for the magnet of Fig. 4, when the device is employed for rectifying 3-phase alternating current to direct current.

Referring to Figs. 1, 2 and 3, there is shown a central post 10 supporting three sets of reeds 11a, 11b and 11c, respectively, each radiating from the post 10 and being angularly displaced 120° from the other two.

Each reed set 11 comprises two vertically displaced reeds 12 and 13, respectively, positioned in the same vertical plane but spaced apart and electrically insulated from each other. Thus the reed set 11a comprises a lower reed 12a and an upper reed 13a; the reed set 11b comprises a lower reed 12b and an upper reed 13b, and the reed set 11c comprises a lower reed 12c and an upper reed 13c. All of the upper reeds 13 are clamped by screws 14 to a metal block 15, and the three lower reeds 12 are similarly clamped to a metal block 16. The two blocks 15 and 16 are separated from each other by an insulating bushing 17, and from a supporting base 18 by an insulating bushing 19. The assembly of blocks 15 and 16 and the insulating bushings 17 and 19 constitute the center post 10, and are clamped to the base 18 by a central screw 20 which is insulated from the blocks 15 and 16.

The two reeds 12 and 13 of each reed set 11 are mechanically secured together at their outer ends by a vertical bar 21 riveted thereto as by rivets 22. An insulating bushing 23 electrically insulates the two reeds 12 and 13 from the bar 21 so that it does not short-circuit them. The bar 21 on the reed set 11a cooperates with and constitutes the driven armature of a magnet 24, and is therefore made of magnetic material, such as iron. The bars 21 on the other reed sets 11b and 11c may be of any desired material, although for convenience in manufacture they will ordinarily be made of iron, identical with the bar 21 on the reed set 11a.

Referring, for the moment, to Fig. 4, the upper clamping member 15 is connected to the positive terminal of a source of direct current, shown as a battery 25, and to one terminal of the winding of magnet 24. The other terminal of the battery 25 is connected through a noninductive resistor 26 to a stationary contact 27 cooperating with the reed 13a, and to the other terminal of the magnet 24. When the apparatus is at rest the contact 27 does not touch the reed 13a, and current flows from the battery 25 through the non-inductive resistor 26 and the winding of magnet 24 in series, to energize the magnet, whereupon its pole-piece 28 attracts the armature 21 on reed 13a and carries the latter into contact with the contact 27. This short-circuits the winding of magnet 24 and deenergizes it, so that the reed set 11a swings back by virtue of its elasticity. This again closes the reed 13a on the contact 27 so that the magnet maintains the reed set 11a in vibration at its natural frequency.

The other reed sets 11b and 11c are tuned to vibrate at the same frequency as reed set 11a, and they are driven from the reed set 11a through connecting springs 30, four of which are associated with each reed set, as shown in Figs. 1 and 2. The springs 30 function to drive the reed sets 11b and 11c from the reed set 11a at the same frequency but symmetrically displaced in phase each from the other two by 120°.

Thus there are two springs 30 positioned on opposite sides of the upper reed 13a and connected thereto by rivets 31. An identical pair of springs 30 are similarly secured to the lower reed 12a and also to the reeds 12b and 13b, and 12c and 13c. The free ends of the adjacent springs 30 on each pair of adjacent reed sets 11a—11b, 11b—11c, 11c—11a, respectively, are positioned closely to each other but without being in contact when the reeds are in neutral position.

For convenience, the adjacent springs on reed sets 11a and 11b, respectively, are identified as springs 30ab; the adjacent springs between reed sets 11b and 11c are identified as springs 30bc; and the adjacent springs between reed sets 11a and 11c are identified as springs 30ac.

This phase displacement results from the fact that when the driving reed set 11a swings counter-clockwise (with reference to Fig. 1) the driving force is immediately applied from reed set 11a to reed set 11c through the coupling springs 30ac, whereas no force is at that time applied from reed set 11a to reed set 11b through the springs 30ab. Hence reed set 11c begins to move counter-clockwise following such movement of reed set 11a, while reed set 11b remains stationary. However, counter-clockwise movement of the reed set 11c out of its neutral position is transmitted through the springs 30bc to the reed set 11b so that reed set 11b finally moves counter-clockwise but its movement lags that of reed set 11c. When the reed set 11a reaches the limits of its counter-clockwise movement and swings in the other direction (clockwise), power is applied from the reed set 11a through springs 30ab to reed set 11b and then from reed set 11b through springs 30bc to the reed set 11c.

It is found in actual practice that in devices constructed as described, the three reed sets 11a, 11b, and 11c vibrate in substantially symmetrical 3-phase relation, even though the stiffness of the springs 30 is varied over a considerable range, the structure appearing to be self-stabilizing into 3-phase operation.

It is also found that considerable tolerance is permissible in the gap that exists between the coupling springs when the reed sets are in neutral position. However, if the springs 30 are set too close together so that they contact each other with any appreciable force while the reeds are in neutral position, the three reed sets will then vibrate in phase with each other, instead of out of phase. It is readily apparent that the tendency for the reeds to vibrate in phase is increased by eliminating the gap between the springs 30, because if the springs press against each other in all positions of the reeds, then movement of the reed set 11a counter-clockwise would urge both the reed sets 11b and 11c counter-clockwise at the same instant. In contrast, when the springs 30 are out of contact with each other in neutral position, counter-clockwise movement of the reed set 11a applies no force at all to reed set 11b while it is applying force to the reed set 11c.

Various known contact arrangements may be employed on the reeds to effect desired results. The circuit shown in Fig. 4 is for producing 3-phase alternating current from the battery 25. To this end, the positive terminal of the battery is connected to all of the upper reeds 13 through the clamping member 15, and the negative terminal of the battery is connected to all of the lower reeds 12 through their clamping member 16. A pair of stationary contacts are associated with and positioned on opposite sides of each reed, and are connected to one phase of the 3-phase circuit. Thus there is shown a 3-phase line 40 connected in delta relation to the secondary windings of three transformers 41, 42, 43, respectively. The two ends of the primary winding of transformer 41 are connected to the two contacts associated with the reeds 13a, and also with the two contacts associated with reed 12a, but in reverse relation. Thus that end of the primary winding of transformer 41 that is connected to the contact on the underside of reed 13a is connected to the contact on the upper side of reed 12a. The result is that when reeds 12a and 13a move clockwise the reed 13a applies positive potential to its upper contact while reed 12a is applying negative potential to its upper contact, thereby causing a current to flow in one direction through the primary winding of transformer 41. When the reeds 13a and 12a swing counter-clockwise they contact their lower contacts and apply current in reverse direction from the battery to the transformer primary.

The primary winding of transformer 42 is similarly connected to the stationary contacts associated with reeds 13c and 12c, and the primary winding of transformer 43 is similarly connected to the stationary contacts associated with reeds 13b and 12b.

It will be apparent that when the reeds are vibrating in symmetrical phase displacement from each other they will apply current to the primary windings of the transformers 41, 42 and 43 in such timed relation as to develop 3-phase current in the line 40.

An actual contact structure that may be employed is illustrated in Figs. 1, 2 and 3. Thus there are associated with the upper reed 13a a pair of contact springs 45 and 46, which are extensions of the springs 30 riveted to that reed and have contact buttons 47 and 48 adapted to abut against stationary contact buttons 49 and 50 mounted on insulating supports 51 and 52, which are supported by brackets 53 and 54 from the base 18. The lower reed 12a likewise has contact springs 55 and 56 which are extensions of the springs 30 on that reed and carry contact buttons 57 and 58 cooperating with contact buttons 59 and 60 mounted on the insulating supports 51, 52, respectively. The contact 59 is connected directly to the contact 50 by a lead 62, and the contact 49 is directly connected to the contact 60 by a lead 63 (Figs. 1 and 2). These leads 62 and 63 are indicated in the circuit diagram of Fig. 4 and it will be observed that it is merely necessary to connect these leads to the opposite ends of the primary winding of transformer 41.

As shown in Fig. 1, the motor contact 27 cooperates with an auxiliary contact button 65 mounted on the contact spring 46. However, if desired, the contact button 65 can be mounted on a separate spring, independent of the spring 46.

The contact structures associated with the reed sets 11b and 11c are identical with that described in connection with the reed set 11a, except that no motor contacts 27 and 65 are provided on reed sets 11b and 11c.

When the device is employed as a rectifier, instead of an inverter, the reeds must be driven in synchronism with the alternating current supply. In other words, the magnet 24 must be energized from the A. C. line instead of the D. C. line. Furthermore, the magnet 24 should be of the polarized type when it is actuated from A. C., else it would tend to drive the vibrators at double frequency. A suitable magnet circuit for use in connection with Fig. 4 when employing the device to rectify current from the 3-phase line 40 is shown in Fig. 5. Thus in Fig. 5 the magnet 24a is of the polarized type and is connected through a phase-shifting network 70 to transformer 41. Many phase-shifting networks are known, and may be used, but a very simple one consisting of a variable reactance 71, a capacitance 72, and a variable resistor 73 is shown in the drawing. By varying the reactance 71 and the resistor 73, the phase of the current in the driving magnet 24a can be varied sufficiently to so control the vibration of the reeds that each reed set will close and open its contacts to its associated transformer winding at the instant the current in that winding is passing through zero.

It is to be understood that the particular circuits shown were chosen only because of their simplicity, and that the invention is not limited to any particular circuit, or to any particular assemblies of contacts. Rather, it resides in the mechanical structure for obtaining polyphase vibration of a plurality of reeds, as set out in the appended claims.

I claim:

1. A polyphase vibratory device comprising: a plurality of vibratory reed members, all tuned to vibrate at the same frequency, means for driving one of said reeds to cause it to vibrate at said frequency, said reeds being symmetrically arranged in a predetermined closed order, and yieldable means intercoupling each adjacent pair of reeds for yieldingly opposing relative movement between said pair of reeds in one direction only.

2. A polyphase vibratory device comprising: a plurality of vibratory reed members, all tuned to vibrate at the same frequency and symmetrically arranged in a predetermined closed order, means for driving one of said reeds to cause it to vibrate at said frequency, yieldable means intercoupling each reed to the next adjacent reeds for yieldingly opposing approach only of any two adjacent reeds toward each other.

3. A polyphase vibratory device comprising: a plurality of vibratory reed members, all tuned to vibrate at the same frequency and radiating from a common central axis, means for driving one of said reeds to cause it to vibrate at said frequency, and spring means mechanically coupling each reed to the two reeds next adjacent thereto, said coupling means opposing relative movement between each adjacent pair of reeds in one direction only.

4. A polyphase vibratory device as described in claim 3, in which said spring means comprises a pair of bow springs on each reed, each bow spring having a free end extending substantially radially from said central axis and being spaced from the cooperating end of the adjacent spring on the next adjacent reed when said reeds are in neutral position.

JAMES S. ARNOLD.